J. FREJ.
HORSESHOE.
APPLICATION FILED APR. 19, 1917.
1,234,747. Patented July 31, 1917.
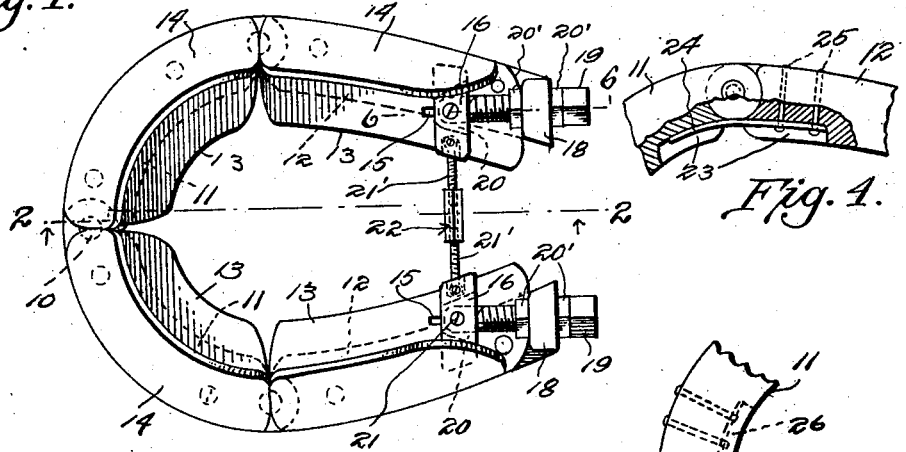
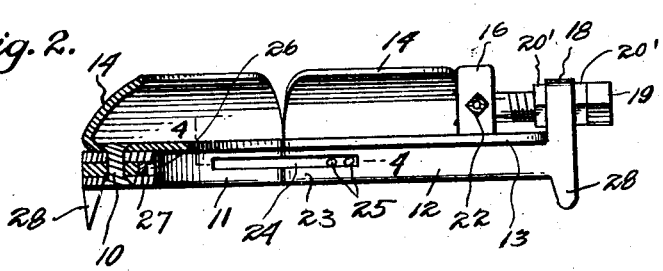
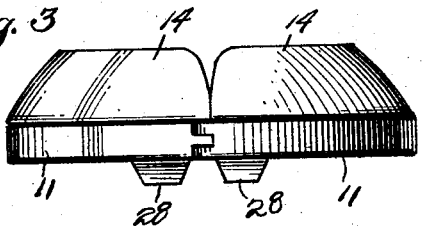
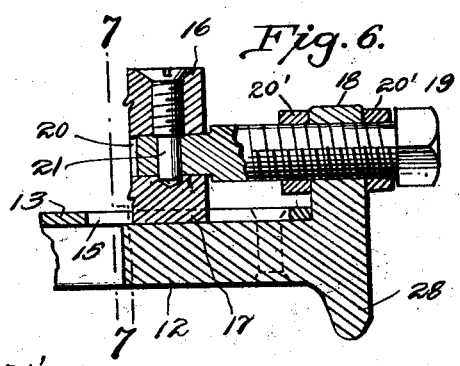
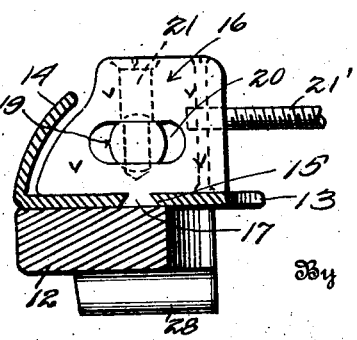
Inventor
John Frej

UNITED STATES PATENT OFFICE.

JOHN FREJ, OF NEW YORK, N. Y.

HORSESHOE.

1,234,747.

Specification of Letters Patent.

Patented July 31, 1917.

Application filed April 19, 1917. Serial No. 163,177.

*To all whom it may concern:*

Be it known that I, JOHN FREJ, a citizen of the United States, residing at New York, in the county of New York and State of New York, have invented certain new and useful Improvements in Horseshoes, of which the following is a specification.

This invention relates to horseshoes, and has special reference to a horseshoe which is adjustable for various sizes and shapes of horses' hoofs.

One important object of the invention is to provide an improved and simplified general construction of this character.

A second important object of the invention is to provide a horseshoe of this class which will be of an improved construction wherein the shoe may be clamped to a horse's hoof in a secure manner without injuring the hoof, the clamping operation effecting adjustment of the shoe both as to size and shape of the hoof.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of a horseshoe constructed in acordance with this invention.

Fig. 2 is a longitudinal section on the line 2—2 of Fig. 1.

Fig. 3 is a front view of the horseshoe.

Fig. 4 is a section on the line 4—4 of Fig. 2.

Fig. 5 is a detail bottom view of one of the joints of the horseshoe.

Fig. 6 is an enlarged detail view on the line 6—6 of Fig. 1.

Fig. 7 is a section on the line 7—7 of Fig. 6.

In carrying out the objects of the invention and in the embodiment herein illustrated, the horseshoe is provided with a body formed in two halves which are substantially symmetrical and these halves are connected at their forward ends by a pivot joint 10, each half consisting of a forward or toe member 11 and a rear or heel member 12. Fixed to these various portions are plates 13 having upwardly and inwardly extending flanges 14 of the proper inclination to engage the toe and side portions of the horse's hoof. The rear end of each of the rear plates 13 is slotted with a dovetailed slot as indicated at 15 and mounted on each of these rear portions is a heel clamp 16 provided with a dovetailed tongue 17 fitting in the slot 15 so that the clamps 16 are slidable longitudinally of the rear members of the shoe. Each of the rear members 12 has at its rear end an upturned perforated lug 18 constituting an eye and through each of these eyes passes a threaded bolt 19 having its forward end flattened and received in a slot 20 in the respective clamp 16, this flattened end being held in the clamp by means of a pivot screw 21. It will be noted that the bolts 19 are slidable through the eyes 18 and that on each side of each lug 18 the bolts are provided with adjusting nuts 20′ so that by proper manipulation of these nuts the heel clamps 16 will be moved forward or backward as the case may be. Pivotally connected to each of these heel clamps is a screw-threaded rod 21′, one of these rods being right-handed and the other left-handed. These rods extend toward each other in alinement and their ends are connected by a turnbuckle 22 so that by rotating this turnbuckle in one direction the heels of the shoe are pulled toward each other while by rotating the turnbuckle in the opposite direction these heels are pushed away from each other.

In order to assist the movement of the heels away from each other the adjacent ends of the members 11 and 12 are provided with slots 23 wherein are located springs 24, one end of each spring being attached to one of the members as by rivets 25. These springs are so arranged that they normally tend to force the heel portions of the shoe apart.

Similarly the adjacent ends of the two portions 11 are recessed at 26 and provided with a spring 27 which tends to assist the springs 24 in widening the shoe.

In operation, the heel clamps are drawn back toward the lugs or eyes 18 and the shoe is adjusted on the horse's hoof. Then by properly manipulating the nuts 20′ and turnbuckle 22 the heel portions of the shoe are drawn together so that the flanges 14 fit closely on the horse's hoof while at the same time the clamps 16 are pushed forward to prevent the shoe from moving longitudinally of the hoof. It will be obvious that suitable calks as at 28 are to be provided on the shoe in the usual manner.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. An adjustable horseshoe comprising a jointed body, heel clamping members slidably mounted on the heel portions of the body, means to adjust the members toward and from the toe of the shoe, and other means to force said members toward and from each other.

2. An adjustable horseshoe consisting of similar sides pivotally connected at the toe of the shoe, each side comprising pivotally connected front and rear members, toe and side flanges carried on said members, heel clamps slidably mounted on the rear members, means to adjust the heel clamps toward and from the toe of the shoe, and other means connecting the heel clamps and arranged to adjust the latter toward and from each other.

3. An adjustable horseshoe consisting of similar sides pivotally connected at the toe of the shoe, each side comprising pivotally connected front and rear members, toe and side flanges carried on said members, heel clamps slidably mounted on the rear members, means to adjust the heel clamps toward and from the toe of the shoe, other means connecting the heel clamps and arranged to adjust the latter toward and from each other, and springs connected to one of the members of each side and bearing against the other member of the respective side to urge the rear members apart.

4. An adjustable horseshoe consisting of similar sides pivotally connected at the toe of the shoe, upturned lugs having eyes at the rear of said sides, heel clamps mounted on the rear portions of the sides for sliding movement longitudinally of said sides, screws connected to the clamps and extending through the eyes, nuts on said screws at opposite sides of the eyes, right- and left-hand screws pivotally connected to the clamps and extending toward each other in alinement, and a turnbuckle connecting the right and left hand screws.

In testimony whereof I affix my signature.

JOHN FREJ.

Witnesses:
TERRY JAVERONE,
VLADIUNE LOANE.

Copies of this patent may be obtained for five cents each, by addressing the "Commissioner of Patents, Washington, D. C."